(12) United States Patent
Tingl

(10) Patent No.: US 6,554,192 B2
(45) Date of Patent: Apr. 29, 2003

(54) DATA CARRIER HAVING OPTION MEANS

(75) Inventor: Ronald Tingl, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/954,649

(22) Filed: Sep. 18, 2001

(65) Prior Publication Data

US 2002/0052991 A1 May 2, 2002

(30) Foreign Application Priority Data

Sep. 19, 2000 (EP) .............................. 00890287
Feb. 6, 2001 (EP) .............................. 01890029

(51) Int. Cl.[7] .............................................. G06K 19/00
(52) U.S. Cl. ........................................ 235/487; 235/380
(58) Field of Search ................................. 235/487, 380; 340/825.33

(56) References Cited

U.S. PATENT DOCUMENTS 4,816,654 A * 3/1989 Anderl et al. ................ 235/380
5,955,961 A * 9/1999 Wallerstein ............. 340/825.33
6,292,863 B1 * 9/2001 Terasaki et al. ............. 710/129

* cited by examiner

Primary Examiner—Karl D. Frech
Assistant Examiner—Lisa M. Caputo
(74) Attorney, Agent, or Firm—Steven R. Biren

(57) ABSTRACT

A data carrier (1) having an electrical circuit (2) includes a receiving device (6) adapted to supply input data (ID) including option control commands (O1, O2, O3, O4), and includes an option control command processing device (11) adapted to process at least one pair of mutually complementary option control commands (O1, O2), (O3, O4) and to generate at least one pair of mutually complementary port control commands (GA, GB), (GC, GD), and further includes port means (12) to which the port control commands (GA, GB, GC, GD) can be applied and which are adapted to be controlled reversibly as regards their port states in dependence on the two mutually complementary port control commands (GA, GB), (GC, GD), and further includes at least one option means (13, 14, 15, 16) which is optionally accessible with the aid of the port device (12).

15 Claims, 1 Drawing Sheet

DATA CARRIER HAVING OPTION MEANS

BACKGROUND OF THE INVENTION

The invention relates to a data carrier including an electrical circuit, which circuit has receiving means adapted to supply input data, which input data may include an option control command, and which has option control command processing means to which the option control command can be applied and which are adapted to generate a port control command in dependence on the option control command, and which has port means to which the port control command can be applied and which can be set from one port state into another port state, which is complementary to said one port state, in dependence on the port control command, and which has at least one option means which is optionally accessible with the aid of the port means in dependence on the port states.

The invention further relates to a circuit for a data carrier, which circuit has receiving means adapted to supply input data, which input data may include an option control command, and which has option control command processing means to which the option control command can be applied and which are adapted to generate a port control command in dependence on the option control command, and which has port means to which the port control command can be applied and which can be set from one port state into another port state, which is complementary to said one port state, in dependence on the port control command, and which has at least one option means which is optionally accessible with the aid of the port means in dependence on the port states.

The invention further relates to a method of gaining access to option means with the aid of port means in a data carrier.

BRIEF SUMMARY OF THE INVENTION

Such a data carrier of the type defined in the first paragraph, having a circuit of the type defined in the second paragraph and in which access to option means is enabled in accordance with the method of the type defined in the third paragraph, has been put onto the market by the Applicant as a so-called SIM card for a mobile phone.

In the known data carrier the port means are formed by a fuse stage, which is melted, i.e. brought into a non-conductive state, upon reception of a corresponding port control command, as a result of which access to optional memory means, provided as option means in the known data carrier and formed with the aid of an EEPROM, is inhibited irreversibly for the entire lifetime of the data carrier. The non-reversible state of the port considerably restricts the operating possibilities of the known data carrier.

It is an object of the invention to avoid the aforementioned restrictions of a data carrier of the type defined in the first paragraph and of a circuit of the type defined in the second paragraph and to provide an improved data carrier and an improved circuit.

The aforementioned object is achieved with a data carrier of the type defined in the first paragraph in that the option control command processing means are adapted to process at least one pair of mutually complementary option control commands and to generate at least one pair of mutually complementary port control commands, and the port means can be controlled reversibly as regards their port states in dependence on the two mutually complementary port control commands.

The aforementioned object is achieved with a circuit of the type defined in the second paragraph in that the option control command processing means are adapted to process at least one pair of mutually complementary option control commands and to generate at least one pair of mutually complementary port control commands, and the port means can be controlled reversibly as regards their port states in dependence on the two mutually complementary port control commands.

In order to achieve the aforementioned objects a method of the type defined in the third paragraph has the characteristic features in accordance with the invention, in such a manner that such a method can be characterized in the manner defined hereinafter, namely:

A method of enabling the access to at least one option means in a data carrier, which data carrier includes receiving means and option control command processing means and at least one option means, which method includes the steps defined hereinafter, namely requesting an option control command from an option control command supplier, and receiving the requested option control command, which when desired is received only upon payment of an option means enabling fee, and transmitting the received option control command to the data carrier, in which data carrier the received option control command is processed with the aid of the option control command processing means so as to enable the access to the at least one option means.

As a result of the measures in accordance with the invention a data carrier and a circuit in accordance with the invention have the advantage that a reversible change-over of the port states of the port means is possible. Moreover, the advantage is obtained that access to the option means is enabled or disabled selectively in dependence on the currently active port state. Furthermore, the advantage is obtained that the operating possibilities of the data carrier are extended considerably and are far more flexible and that the operating possibilities can even be adapted to the prevailing operational requirements throughout the lifetime of the data carrier.

Furthermore, the advantage is obtained that the data carrier can be manufactured in very large quantities by a data carrier manufacturer. Another advantage is that a circuit manufacturer, i.e. a manufacturer of an integrated circuit which at least for the greater part forms the circuit of the data carrier, can manufacture the circuit of the data carrier at low cost. A further advantage is that after the data carrier or the circuit of the data carrier has been sold an option means can be enabled subsequently after the sale of the data carrier or the circuit of the data carrier at the request of a customer and upon payment of an option-means enabling fee, as a result of which the operating possibilities of a data carrier and a circuit in accordance with the invention are extended significantly when the owner of such a data carrier wants such an extension. This makes it possible to achieve a higher added value for such a data carrier.

With such a data carrier in accordance with the invention security requirements play a crucial role because the reversible control of the port states of the data carrier normally does not take place in a secure environment, where the security precautions are guaranteed by external security measures, but in a freely accessible and therefore unprotected environment and the risk of abuse is consequently very high. In order to allow for these stringent security requirements imposed on a data carrier in accordance with the invention and a circuit in accordance with the invention it has proved to be particularly advantageous when in addition the characteristic features as defined in claim 2 and claim 9, respectively, are provided. The provision of the characteristic features as defined in claim 2 and claim 9, respectively, has the advantage that the security precautions required in conjunction with the reversible control have been provided directly in the data carrier itself.

It has proved to be particularly advantageous when a data carrier in accordance with the invention and a circuit in accordance with the invention have the characteristic features as defined in claim 3 and in claim 10, respectively, because this makes it possible to enable or to inhibit access to a multitude of individual option means in a highly selective manner and because this makes it even possible to arrange option means in functional groups by enabling or inhibiting access to the respective group of options means via a single port means.

In a data carrier in accordance with the invention and in a circuit in accordance with the invention the option memory means can be formed with the aid of an EEPROM. However, it has proved to be advantageous to realize the option memory means with the aid of a flash memory because, as compared with an EEPROM, this flash memory requires a substantially smaller surface area on a chip which forms a part of the electrical circuit in accordance with the invention of the data carrier in accordance with the invention and the data carrier and the circuit as well as the chip can be manufactured particularly cheaply. Moreover, the advantage is obtained that an EEPROM included in the data carrier or in the circuit can be used chiefly for the storage of useful data, while applications are advantageously stored in the flash memory. Furthermore, a major advantage obtained in the implementation of an operating system for the data carrier in accordance with the invention and for the circuit in accordance with the invention is that only a basic part of the operating system has to be stored in a ROM, whereas an optional part of the operating system is advantageously stored in the flash memory, as a result of which an adaptation of the operating system to, for example, a modified standard can be performed in a highly flexible manner and without any problems by means of a software update of the optional part of the operating system, which part is stored in the flash memory.

As a result of the provision of the characteristic features as defined in claim 5 and in claim 12, respectively, it is advantageously achieved that the optional communication with the aid of the option bus means can be enabled only if necessary. This has the additional advantage that the stringent security requirements can be complied with to a maximal extent because an illegitimate communication with the aid of the option bus means is very unlikely to occur during an option bus means access which is enabled only when necessary, i.e. under well controlled conditions.

In the industry USB has developed into quasi-standard. Therefore, it has proved to be particularly advantageous to provide the characteristic features as defined in claim 6 and in claim 13 in a data carrier in accordance with the invention because this enables an optional communication with a multitude of apparatuses equipped with this quasi-standard to be realized under well controlled conditions.

By the provision of the characteristic features as defined in claim 7 and in claim 14, respectively, it is achieved in an advantageous manner that an increased need for computing power in a data carrier in accordance with the invention and in a circuit in accordance with the invention can be satisfied rapidly and flexibly with the aid of the option computing means, which can be activated optionally.

The aforementioned aspects as well as further aspects of the invention will be apparent from the example of an embodiment described hereinafter and will be elucidated with the aid of this example.

The invention will be described in more detail hereinafter with reference to an embodiment which is shown in the drawing by way of example but to which the invention is not limited.

DETAILED DESCRIPTION OF THE INVENTION

Figure 1:
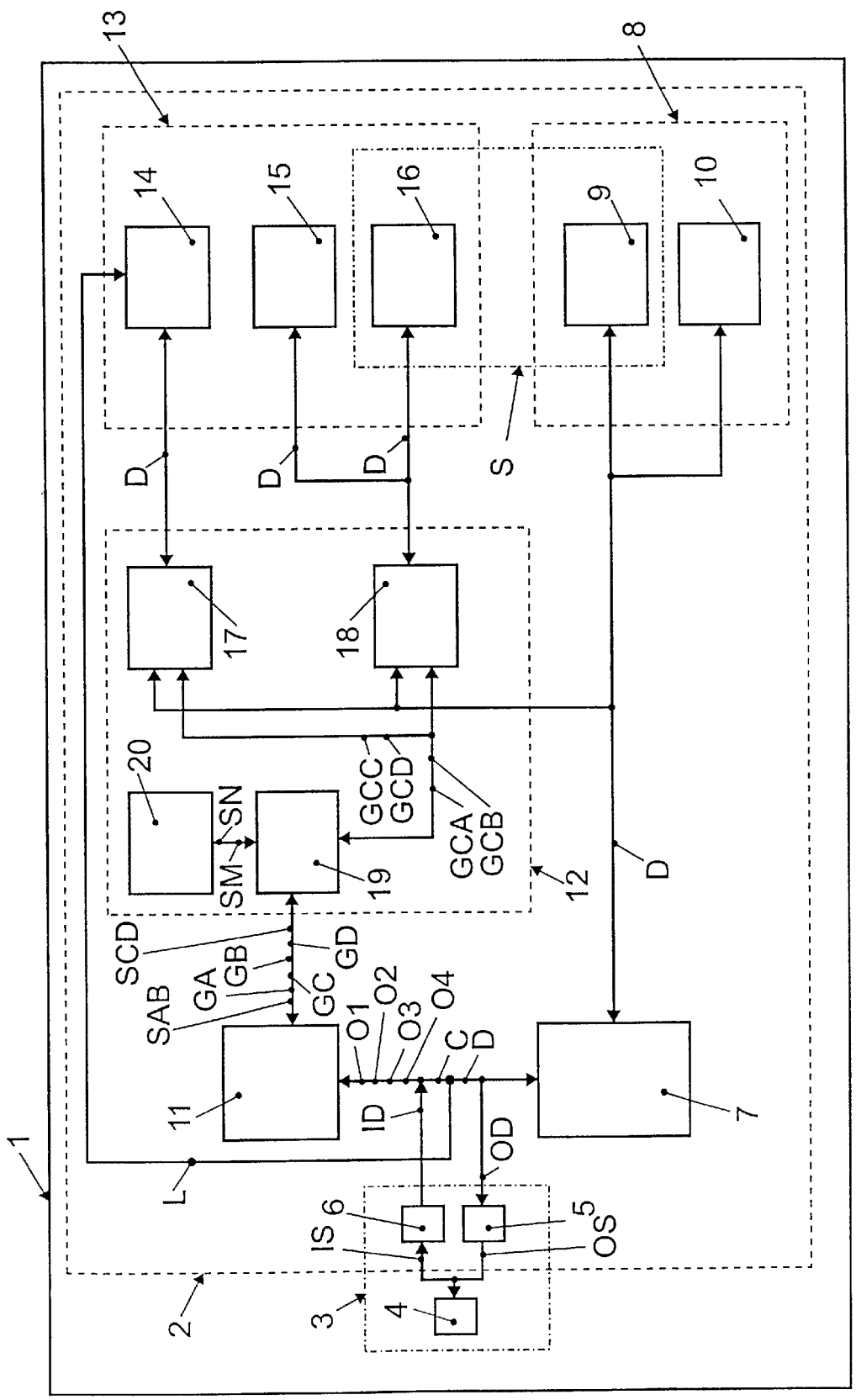
FIG. 1 shows diagrammatically in the form of a block diagram a data carrier including a circuit in accordance with an embodiment of the invention.

FIG. 1 shows a data carrier 1, which forms a SIM card for a mobile phone, not shown in FIG. 1. The data carrier includes an electrical circuit 2 and interface means 3. With the aid of the interface means 3 it is possible to communicate between the mobile phone and the data carrier 1, i.e. the electrical circuit 2 of the data carrier 1. For this purpose, the interface means include an interface stage 4, which takes the form of a contact pad. The interface means 3 further include receiving means 6, included in the electrical circuit 2, as well as transmitting means 5, also included in the electrical circuit 2. The interface stage 4 is connected both to the receiving means 6 and to the transmitting means 5, as a result of which the interface stage 4 can supply input signals IS to the receiving means 6 and as a result of which the transmitting means 5 can supply output signals OS to the interface stage 4. In this context it is to be noted that the interface means 3 are also adapted to generate, to stabilize and to smooth a supply voltage which is required for the operation of the electrical circuit 2 and which can be applied with the aid of the interface stage 4. The receiving means 6 are adapted to receive the input signals IS and to generate and to supply input data ID in conformity with the received input signals IS. The input data ID may include commands C and useful data D as well as option control commands O1, O2, O3 and O4. The transmitting means 5 are adapted to receive output data OD and to generate and to supply the output signals OS in conformity with the output data OD, the output data OD including useful data D which can be stored and processed with the aid of the electrical circuit 2.

The data carrier 1 further includes command processing means 7 and standard means 8. The command processing means 7 are adapted to detect and to process the commands C contained in the input data ID. The command processing means 7 are further adapted to access the standard means 8, i.e. to write the useful data D into the standard means 8 and to read useful data D readable from the standard means 8, in accordance with the commands C. The standard means 8 include standard memory means 9, which are formed with the aid of a ROM and an EEPROM and which can store useful data D. The standard means 8 further include standard computing means 10 which are formed with the aid of an arithmetic-logic unit and by means of which useful data D can be processed or computed. In connection with the standard computing means 10 it is to be noted that the useful data D or the commands C may also include computing commands for controlling the standard computing means 10.

The data carrier 1 further includes option control command processing means 11 as well as port means 12 and option means 13. The option control command processing means 11 are serve to and are adapted to receive and process the option control commands O1, O2, O3 and O4 and generate and supply port control commands GA, GB, GC and GD. The port means 12 serve to and are adapted to receive and process the port control commands GA, GB, GC and GD and can be switched between complementary port states in dependence on the port control commands GA, GB, GC and GD. The option means 13 include option bus means 14 and option computing means 15 as well as option memory means 16. The option bus means 14 are connected to the interface means 3 via a line L and are formed by means of a USB. The option computing means 15 are formed with the aid of a crypto-coprocessor. The option memory means 16 are formed by means of parts of the EEPROM forming the standard memory means 9 and by means of parts of the ROM forming the standard memory means 9 as well as by means of a FLASH-EEPROM, i.e. by means of non-volatile memory means. It is to be noted that the option memory means 16 may alternatively be formed by means of an FE RAM or by means of a RAM or by means of an M RAM, i.e. by means of volatile memory means. The standard memory means 9 and the option memory means 16 form memory means S of the data carrier 1.

In the present case, the command processing means 7, the option control command processing means 11 and the port means 12 are formed with the aid of a microprocessor which can execute programs stored in the memory means S. It is to be noted that the command processing means 7, the option control command processing means 11 or the port means 12 may alternatively take the form of a hard-wired logic circuit. It is to be noted that the option control commands O1, O2, O3 and O4 may also be realized with the aid of executable programs which may each include a sequence of program steps. In this connection it is to be noted further that the option control command processing means 11 may be adapted to process the program steps of the option control commands O1, O2, O3 and O4.

The port means 12 include a first port stage 17 and a second port stage 18. The first port stage 17 is adapted to receive a first port stage control code GCA contained in the first port control command GA and to receive a second port stage control code GCB contained in the second port control command GB and complementary to the first port stage control code GCA. The second port stage 18 is adapted to receive a third port stage control code GCC contained in the first port control command GC and to receive a fourth port stage control code GCD contained in the fourth port control command GD and complementary to the first port stage control code GCC. The first port stage 17 and the second port stage 18 have a first port state and a second port state complementary thereto. In response to the reception of the first port stage control code GCA the first port stage 17 can be set to its first port state and in response to the reception of the second port stage control code GCB can be set to its second port state. In response to the reception of the third port stage control code GCC the second port stage 18 can be set to its first port state and in response to the reception of the fourth port stage control code GCD can be set to its second port state. Thus, the first port stage 17 of the port means 12 is adapted to be controlled reversibly as regards its two port states in dependence on the two mutually complementary port control commands GA and GB. Likewise, the second port stage 18 of the port means 12 is adapted to be controlled reversibly as regards its two port states in dependence on the two mutually complementary port control commands GC and GD.

The command processing means 7 can access the option bus means 14 with the aid of the first port stage 17 while the first port stage 17 is in the first port state. Access to the option bus means 17 by the command processing means 7 is inhibited with the aid of first port stage 17 when the first port stage 17 is in the second port state. The command processing means 7 can access the option memory means 16 and the option computing means 15 with the aid of the second port stage 18 while the second port stage 18 is in the first port state. Access to the option memory means 16 and to the option computing means 15 by the command processing means 7 is inhibited with the aid of second port stage 18 when the second port stage 18 is in the second port state. Thus, the option means 17 are optionally accessible with the aid of the port means 12.

The port means 12 further include security code comparison means 19 and security code memory means 20. The security code comparison means 19 are connected to the option control command processing means 11 and to the security code memory means 20. The security code comparison means 19 are adapted to receive a first port control command GA and a second port control command GB, which is complementary thereto, which commands form a pair of mutually complementary port control commands, each of the two port control commands GA and GB containing a first security code SAB. The first port control command GA further includes the first port stage control code GCA and the second port control command GB further includes the second port stage control code GCB. The security code comparison means 19 are further adapted to receive a third port control command GC and a fourth port control command GD, which is complementary thereto, each of the two port control commands GC and GD including a second security code SCD. The third port control command GC further includes the third port stage control code GCC. The fourth port control command GD further includes the fourth port stage control code GCD.

The security code memory means 20 are adapted to store a third security code SM and a fourth security code SN.

The security code comparison means 19 are adapted to compare the first security code SAB included in the port control command GA or GB with the third security code SM, which can be read from the security code memory means 20, when the first port control command GA is received or when the second port control command GB is received. The security code comparison means 19 are further adapted to supply the first port stage control code GCA in accordance with the first port control command GA or to supply the second port stage control code GCB in accordance with the second port control command GB in the case of coincidence of the first security code SAB with the third security code SM. The security code comparison means 19 are further adapted to compare the second security code SCD, contained in one of the port control commands GC and GD, with the fourth security code SN, stored in security code memory means 20, when respectively the third port control command GC or the fourth port control command GD is received. The security code comparison means 19 are adapted to supply the third port stage control code GCC in accordance with the third port control command GC or to supply the fourth port stage control code GCD in accordance with the fourth port control command GD in the case of coincidence of the second security code SCD with the fourth security code SN.

Thus, the port means 12 are adapted to receive the port control commands GA, GB, GC and GD and to optionally enable access to the option means or inhibit access to the option means 13 in dependence on the port control commands GA, GB, GC and GD.

The option control command processing means 11 are adapted to detect a first option control command O1 and a second option control command O2 and a third option control command O3 and fourth option control command O4, the first option control command O1 and the second option control command O2 forming a first pair of mutually complementary option control commands O1 and O2, and the third option control command O3 and the fourth option control command O4 forming a second pair of mutually complementary option control commands O3 and O4. The option control command processing means 11 are further adapted to generate and to supply the first port control command GA upon detection of the first option control command O1 and to generate and to supply the second port control command GB upon detection of the second option control command O2. The option control command processing means 11 are further adapted to generate and to supply the third port control command GC upon detection of the third option control command O3 and to generate and to supply the fourth port control command GD upon detection of the fourth option control command O4. The option control command processing means 11 are further adapted to process and to supply the first security code SAB included in the first option control command O1 or in the second option control command O2 and to process and to supply the second security code SCD included in the third option control command O3 or in the fourth option control command O4. During processing the option control command processing means 11 are adapted to generate and to supply the first pair of mutually complementary port control commands GA and GB, which contain the first security code SAB, and to generate and to supply the second pair of mutually complementary port control commands GC and GD, which contain the second security code SCD. It is to be noted that the option control command processing means 11 are also adapted to decrypt the option control commands O1, O2, O3 or O4 in the case that encrypted option control commands O1, O2, O3 or O4 are present.

The operation of the data carrier 1 will now be explained hereinafter with the aid of an example of use for the data carrier 1 shown in FIG. 1.

By means of the example of use it is described how the optional access of the command processing means 7 to the option means 13 of the data carrier 1 can be enabled or inhibited. First of all, the data carrier 1 is supplied by a data carrier manufacturer in a basic configuration and sold directly or indirectly to a network service provider of a radio network for mobile telephones, in which basic configuration the first port stage 17 and the second port stage 18 are in their respective second states, i.e. a configuration in which access to the option means 13 by the command processing means 7 is inhibited. As is common practice nowadays, the network service provider sells a mobile phone together with a Subscriber Identity Module (SIM) card, formed by means of the data carrier 1, to a customer. The mobile phone is, for example, a Wireless Access Point (WAP)-type mobile phone, which is initially used by the customer for making telephone calls and for receiving WAP information from internet sites suitable for WAP. In the course of this use the wish arises for the customer to store bookmarks for frequently visited internet sites in a bookmark memory formed with the aid of the standard memory means 9, or to store address book entries for frequently used telephone numbers in an address book memory formed with the aid of the standard memory means 9. For this purpose, appropriate commands C and associated useful data D are transmitted from the mobile telephone to the command processing means 7 of the electrical circuit 2 via the interface means 3 and as a result of the processing of the command C useful data D representing a bookmark for frequently visited WAP internet sites or useful data D representing an address entry are written into the standard memory means 9. The bookmark or address book entry now stored in the standard memory means 9 can subsequently read from the standard memory means 9 as useful data D with the aid of appropriate commands C transmitted to the command processing means 7 via the interface means 3 and can be transmitted, for further processing, to the mobile telephone via the interface means 3 of the data carrier 1 with the aid of the output data OD representing the useful data D.

In the course of this use of the mobile telephone the customer is informed, for example, by his financial institution that it is possible, in principle, to manage his account with the financial institution with the aid of the WAP-type mobile telephone in cooperation with the network service provider. However, for this purpose the customer should first submit an application for the option memory means 16 and the option computing means 15 to be enabled, because a bank application is to be stored in the memory means S of the data carrier by means of WAP information and because the crypto-coprocessor forming the option computing means 15 should be used for the encryption of secret data for managing the account with the aid of the mobile telephone. The application for enabling of the access to the option computing means 15 and to the option memory means 16 is possible, for example, by means of a registered letter or via the WAP internet site or via a conventional internet site or by means of a code word to be submitted when the network service provider is called. Subsequently, the network service provider requests the second security code SCD from the data carrier manufacturer and is conveyed to the network service provider by the data carrier manufacturer upon payment of an option means enabling fee of the network service provider. Upon receipt of the second security code SCD this code is transmitted by radio to the mobile telephone, i.e. to the circuit 2 of the data carrier 1, by the network service provider as a part of the third option control command O3. The input data ID supplied by the receiving means 6 then include the third option control command O3. The option control command processing means 11 detect the third option control command O3 in the input data ID. Furthermore, the option control command processing means 11 supply the third port control command GC together with the second security code SCD to the security code comparison means 19 with the aid of the third option control command O3. The security code comparison means 19 compare the security code SCD in the third port control command GC with the fourth security code SN stored in the security code memory means 20 and in the case of a valid authorization to enable the access to the option computing means 15 and to the option memory means 16, the third port stage control code GCC is applied to the second port stage 18. In accordance with the third port stage control code GCC the second port stage 18 is set to its first port state, thereby enabling the command processing means 7 to access the option computing means 15 and the option memory means 16. The user is informed by means of a display of the mobile telephone that parts of the option means 13 have thus been enabled. Subsequently, the user can receive the application required for managing his account and made available with the aid of a WAP internet site and can store it in the option memory means 16 with the aid of the command processing means 7 and can manage his account with the financial institution with the aid of this application during a cooperation of the application with the option computing means 15. When the customer for the first time uses the account management application stored in the option memory means 16 to manage his account, however, he is also informed that he can terminate the use of this service at any time. For this, he should merely contact his network service provider. The service provider can then transmit the fourth option control command O4 to the electrical circuit 2 in the data carrier 1 in the mobile telephone by radio. The option control command processing means 11 then detect the fourth option control command O4 and apply the fourth port control command GD, which includes the second security code SCD, to the security code comparison means 19. Subsequently, the security code comparison means 19 compare the second security code SCD with the fourth security code SN stored in and readable from the security code memory means 20. In the case of coincidence of the second security code SCD with the fourth security code SN, i.e. in the case of a valid authorization to disable the access to the option computing means 15 and to the option memory means 16, the security code comparison means 19 supply the fourth port stage control code GCD to the second port stage 18. In response to the reception of the fourth port stage control code GCD the second port stage 18 is set to its second port state and access to the option computing means 15 and to the option memory means 16 is inhibited.

This disabling can be utilized, for example, when the customer no longer values the use of the account management service with the aid of his mobile telephone or when the customer has lost his mobile telephone including the data carrier 1 and wishes to protect his account against unauthorized manipulation. This possibility can also be used when then user acts contrary to the terms of business of the network service provider or the terms of business of his financial institution. Thus, with the aid of option control command processing means 11, which are adapted to process the second pair of mutually complementary option control commands O3 and O4 and to generate the second pair of mutually complementary port control commands GC and GD, and with the aid of the reversible port states of the port means 12 a highly flexible adaptation of the operating possibilities to the prevailing operational requirements throughout the lifetime of the data carrier 1 is guaranteed in a very advantageous manner.

The customer may also wish to update his address book entries in the standard memory means 9 with the aid of his computer or to update a calendar application stored in the standard memory means 9 with the aid of his computer. In the present case, the mobile telephone has a USB port for the connection of the data carrier 1 to the computer of the user. However, the user should first request the network service provider to enable access to the option bus means 14. In response to, as in the preceding case, the network service provider transmits an enabling code obtained from the data carrier manufacturer, namely the first security code SAB in the present case, by radio to the mobile telephone and, consequently, to the electrical circuit 2 of the data carrier 1 via the interface means 3 as a part of the first option control command O1 included in the input data ID. The option control command processing means 11 detect the first option control command O1 in the input data ID and generate the first option control command GDA, which includes the security code SAB. The security code comparison means 19 receive the first port control command GA and compare the first security code SAB with the third security code SM, which can be read from the security code memory means 20. In the case of coincidence of the first security code SAB with the third security code SM the security code comparison means 19 supply the first port stage control code GCA to the first port stage 17. The first port stage 17 is set to its first port state in accordance with the first port stage control code GCA and thus enables the command processing means 7 to access the option bus means 14. After access to the option bus means 14 has been enabled the user can load the calendar application into the standard memory means 9 with the aid of the USB interface of the mobile telephone and can update the calendar application with calendar data generated with the aid of the calendar application and likewise stored in the standard memory means 9.

However, the calendar application may also have a security query, such as for example a user name and a password. After a repeated query for this user name and this password and after a repeated incorrect entry the calendar application may, for example, have the feature that this application automatically requests the second option control command O2 from the network service provider by radio with the aid of the mobile telephone. After reception of the second option control command O2 with the aid of the interface means 3 the electrical circuit 2 of the data carrier 1 detects the second option control command O2 with the aid of the option control command processing means 11 and, in response to the detection of the second option control command O2, the second port control command GB, which includes the first security code SAB, is generated and supplied. The security code comparison means 19 compare the first security code SAB with the third security code SM stored in the security code memory means 20. In the case of coincidence of the two security codes SAB and SM the security code comparison means 19 supply the second port stage control code GCB to the first port stage 17, as a result of which the first port stage 17 is set to its second port state. In accordance with the second port stage control code GCB access to the option bus means 14 by the command processing means 7 is inhibited from now on with the aid of the first port stage 17 included in the port means 12, as a result of which in the event of suspicion of an unauthorized access to the calendar data an unauthorized manipulation of the data of the calendar application by accessing the memory means S via the option bus means 14 is inhibited effectively for security reasons.

Thus, with the aid of option control command processing means 11, which are adapted to process the first pair of mutually complementary option control commands O1 and O2 and to generate the first pair of mutually complementary port control commands GA and GB, and with the aid of the reversible port states of the port means 12 a highly flexible adaptation of the operating possibilities to the prevailing operational requirements throughout the lifetime of the data carrier 1 is guaranteed in a very advantageous manner.

It is to be noted that the network service provider may request and receive not only the security code SAB or SCD but also the entire option control command O1, O2, O3 or O4 from the data carrier manufacturer. The data carrier manufacturer then acts as an option control command supplier. Moreover, it is to be noted that the option control command supplier may alternatively be a third party, such as for example a system provider for a mobile radio network.

It is to be noted that the data carrier 1 may form an electronic driver's license and that the option means 13 are formed with the aid of memory means that can be enabled and disabled, which memory means may store data representative of driver authorizations and a driver's license application, and that the options means 13 can be enabled by a government authority in response to having passed a driving test and in response to payment of the option means enabling fee to the government authority. In the case of a violation of the traffic regulations the relevant government authority may wholly or partly inhibit parts of the option means 13 with the aid of the port means.

It is to be noted that the data carrier 1 may form a medical insurance card of a health insurance company and that in dependence on an insurance fee paid by an insured person the health insurance company can optionally enable parts of the options means 13. As a result of a reduction of the insurance fee paid by the insured person the health insurance company can inhibit parts of the option means 13 or the complete option means 13, thereby allowing the insured person to claim only limited services.

It is to be noted that the data carrier 1 may form an electronic ticket, in which parts of the option means can be enabled by a mass transportation company in dependence on the amount of the transportation charges, as a result of which a passenger can be offered optional services in a mass transportation means on account of the option means 13 thus enabled. The optional services may be, for example, a customer relations program of the mass transportation company or a mileage card. In any case, there an increased memory capacity is required, which can be satisfied with the aid of the option means 13.

It is to be noted that the data carrier 1 may form a bank service card and the bank or the financial institution can enable parts of the option means 13 in dependence on the creditworthiness of the customer, as a result of which the customer is entitled to different services from a band service terminal in dependence on the enabled parts of the option means 13.

It is to be noted that the interface means 4 may also be adapted to provide inductive or capacitive communication.

It is to be noted that the option computing means 15 may alternatively be formed with the aid of a signal processor, as a result of which the data carrier 1 can process, for example, biometric parameters more rapidly.

It is to be noted that the option bus means 14 may alternatively be formed with the aid of an I²C bus or an SPI bus.

It is to be noted that the option means 13 may include clock means adapted to speed up or slow down a data processing rate of the data carrier 1.

It is to be noted that in relation to the transmission of an option control command O1, O2, O3 or O4 to the data carrier use can be made of a keyboard which is adapted to communicate with the data carrier. However, in this connection it is also possible to use a data carrier communication device which can be connected to, for example, a personal computer. For the connection to the personal computer the data carrier communication device may be equipped with, for example, a serial interface or with a parallel interface or with a USB interface or with a wireless personal area network interface, i.e., BLUETOOTH.

What is claimed is:

1. A data carrier including an electrical circuit, which circuit has receiving means adapted to supply input data, which input data may include an option control command, and option control command processing means to which the option control command can be applied and which are adapted to generate a port control command in dependence on the option control command, and port means to which the port control command can be applied and which can be set from one port state into another port state, which is complementary to said one port state, in dependence on the port control command, and at least one option means which is optionally accessible to at least a command processing means with the aid of the port means in dependence on the port states, characterized in that the option control command processing means are adapted to process at least one pair of mutually complementary option control commands and to generate at least one pair of mutually complementary port control commands, and the port means can be controlled reversibly as regards their port states in dependence on the two mutually complementary port control commands.

2. A data carrier as claimed in claim 1, characterized in that the option control command processing means are adapted to process and to supply a security code included in an option control command, and the port means include security code memory means which store at least one security code, and the port means include security code comparison means, which are connected to the option control command processing means and to the security code memory means and with the aid of which a security code supplied by the option control command processing means can be compared with a security code read from the security code memory means.

3. A data carrier as claimed in claim 2, characterized in that the port means include a plurality of port stages, and there has been provided at least one option means corresponding to each port stage.

4. A data carrier as claimed in claim 2, characterized in that option memory means adapted to optionally allow the storage of data have been provided as a first option means, and the option memory means are formed with the aid of a flash memory.

5. A data carrier as claimed in claim 2, characterized in that option bus means adapted to provide optional communication have been provided as a second option means.

6. A data carrier as claimed in claim 5, characterized in that the option bus means are formed by means of a USB.

7. A data carrier as claimed in claim 2, characterized in that option computing means have been provided as a third option means.

8. A circuit for a data carrier, which circuit has receiving means adapted to supply input data, which input data may include an option control command, and option control command processing means to which the option control command can be applied and which are adapted to generate a port control command in dependence on the option control command, and port means to which the port control command can be applied and which can be set from one port state into another port state, which is complementary to said one port state, in dependence on the port control command, and at least one option means which is optionally accessible to at least a command processing means with the aid of the port means in dependence on the port states, characterized in that the option control command processing means are adapted to process at least one pair of mutually complementary option control commands and to generate at least one pair of mutually complementary port control commands, and the port means can be controlled reversibly as regards their port states in dependence on the two mutually complementary port control commands.

9. A circuit as claimed in claim 8, characterized in that the option control command processing means are adapted to process and to supply a security code included in an option control command, and the port means include security code memory means which store at least one security code, and the port means include security code comparison means, which are connected to the option control command processing means and to the security code memory means and with the aid of which a security code supplied by the option control command processing means can be compared with a security code read from the security code memory means.

10. A circuit as claimed in claim 9, characterized in that the port means include a plurality of port stages, and there has been provided at least one option means corresponding to each port stage.

11. A circuit as claimed in claim 9, characterized in that option memory means adapted to optionally allow the storage of data have been provided as a first option means, and the option memory means are formed with the aid of a flash memory.

12. A circuit as claimed in claim 9, characterized in that option bus means adapted to provide optional communication have been provided as a second option means.

13. A circuit as claimed in claim 12, characterized in that the option bus means are formed by means of a USB.

14. A circuit as claimed in claim 9, characterized in that option computing means have been provided as a third option means.

15. A method of enabling the access to at least one option means in a data carrier, which data carrier includes receiving means and option control command processing means and at least one option means, which method includes the steps defined hereinafter, namely requesting an option control command from an option control command supplier, and receiving the requested option control command, which when desired is received only upon payment of an option means enabling fee, and transmitting the received option control command to the data carrier, in which data carrier the received option control command is processed with the aid of the option control command processing means so as to enable the access to the at least one option means by at least a command processing means.

* * * * *